March 22, 1932.   A. B. FOWLER   1,850,098
ABRADING MACHINE
Filed April 10, 1925   4 Sheets-Sheet 2

INVENTOR
Alfred B. Fowler
By his Attorney
Nelson M. Howard

March 22, 1932. A. B. FOWLER 1,850,098
ABRADING MACHINE
Filed April 10, 1925 4 Sheets-Sheet 3

Fig.3.

INVENTOR.
Alfred B. Fowler
By his Attorney,
Nelson W. Howard

Patented Mar. 22, 1932

1,850,098

UNITED STATES PATENT OFFICE

ALFRED B. FOWLER, OF BEVERLY, MASSACHUSETTS, ASSIGNOR TO UNITED SHOE MACHINERY CORPORATION, OF PATERSON, NEW JERSEY, A CORPORATION OF NEW JERSEY

ABRADING MACHINE

Application filed April 10, 1925. Serial No. 22,144.

This invention relates to abrading machines and is herein illustrated as embodied in a machine designed for grinding blades of rotary cutters adapted for use in heel-trimming machines, although in various aspects the invention is not limited to embodiment in abrading machines of the illustrated type or to use in grinding heel-trimming cutters, but may be embodied in analogous organizations and be useful for similar abrading operations.

Rotary cutters of the type customarily employed in machines for trimming the peripheries of heels are each provided with a plurality of longitudinally curved blades having surface and cutting edge profiles determined by the heel contours it is desired to produce. In order that such cutters shall perform trimming operations properly, it is essential that all the blades of a given cutter be ground so that their cutting edges shall have exactly the same bevel and profile. Prior to the invention disclosed and claimed in my co-pending application, Serial No. 22,143, filed April 10, 1925, which has become Patent No. 1,753,855, dated April 8, 1930, it was necessary that the blades of such cutters be removed from the cutter heads for grinding and presented individually to the grinding element. This involved the laborious operations of disassembling the cutter heads to remove the blades for grinding and reassembling the cutter heads and blades after the grinding. When the presentation of the blades to the grinding element was controlled manually it depended entirely upon the skill of the workman to secure the desired profile of the cutting edge as well as its bevel. Not only was this a slow operation, but even an expert who was able to grind one such blade with fair accuracy by manual control could not grind a companion blade like the first one. This difficulty was further complicated by the wide variation in surface and cutting edge profiles of such rotary cutter blades, ranging all the way from a plain blade with a substantially straight line cutting edge for trimming men's heels having substantially straight vertical sides to blades of the molded type, known as Ultima blades, which are curved both laterally and longitudinally and whose cutting edges may vary from a straight profile to an ogee curve profile such as is required for operation on Louis heels. Even when fixtures providing grinding templets were employed, there was no certain way for the operator to determine the amounts ground away from the various blades, with the result that the blades were liable to be reduced to unequal lengths, and in consequence it was at least difficult to reposition the blades properly in the cutter head after grinding. By my invention above referred to, there was provided for the first time a rotary cutter of the type under consideration which was organized to make it practicable to grind longitudinally curved cutting blades, having their cutting edges on the concave surfaces of the blades and extending in the general direction of the axes of curvature of the blades, without removing them from the cutter head.

With the foregoing considerations in mind, the present invention has for an object the provision of an improved abrading machine for operating on curved blades having their cutting edges extending in the general direction of the axes of curvature of the blades, which machine will be adapted to receive and present, to an abrading element, cutters of the type disclosed in the application referred to, in assembled condition, and to operate on the blades mounted in the head of the cutter in such a manner that all of the blades will be reduced to a uniform length and have imparted to them cutting edges of the same predetermined profile and predetermined uniform edge bevel.

To the accomplishment of this object, the invention provides a novel abrading machine comprising an abrading element, a slide bar, a work holder supported by the slide bar for traversing movement therewith, means to feed the holder bodily toward the abrading element at the end of each traversing movement of the slide bar, means actuated by the traversing movement for rocking the holder toward and away from the abrading element to impart a predetermined shape to the work, and yielding means tending to rock the holder toward the abrading element. In the illustrated organization, a templet mechanism is shown as the means for controlling the rocking movement of the work holder to effect a relative movement of approach and recession between the blade and the abrading element as the slide bar and work holder reciprocate to carry the blade along the abrading element, so that a predetermined shape will be imparted to the work.

A further feature of the invention consists in the provision, in a machine for operating upon the blades of an assembled rotary cutter head, of a table, a rotary abrading element mounted upon the table, a carriage mounted upon the table for movement at right angles to the axis of the abrading element, bearings mounted within the carriage, a slide bar extending through the bearings, a yoke mounted at one extremity of the slide bar, a work holder mounted at one end of the yoke, and a follower roll mounted at the opposite end of the yoke for engagement with a templet carried by the carriage. Preferably, and in the illustrated construction, the work holder is pivoted, the means for engaging the templet being located upon one side of the axis of this pivot and the abrading element being located on the opposite side of the axis.

Another and important feature of the invention consists in the provision, in an abrading machine, of an abrading element, a work holder constructed and arranged to present an end of a longitudinally arcuate cutter blade to the abrading element to form on the concave surface of the blade a cutting edge and a pivot about which the holder may swing to bring the end of the blade into contact with the abrading element, the pivot being coaxial with the axis of curvature of the blade whereby the swinging movement will give to the edge a constant bevel irrespective of the length of the blade at the point being abraded. Preferably, and in the illustrated construction, the pivot is adjustable relatively to the abrading element so that the bevel may be adjustably predetermined and the swinging of the work holder carrying the blades of an assembled rotary cutter is preferably combined with a movement of each blade, in the general direction of its axis of curvature, across the face of the abrading element. This arrangement produces identically the same cutting edge on each blade, at equal distances from the axis of rotation of the assembled cutter head, with the cutting edges extending in the general direction of the axes of curvature of the blades, and with the edges having uniform predetermined bevels, irrespective of the profile or contour of the edges.

In order to present the end of the longitudinally arcuate cutter blade to the abrading element to form a cutting edge on the concave surface of the blade, and produce the effective cutting edge shown in the co-pending application referred to above, the pivot of the work holder is positioned to present the convex side of the blade to the abrading element, although the invention is not limited to such a construction.

Further features of the invention, the scope of which may be determined from the appended claims, are more fully described in the following specification and shown in the accompanying drawings, in which

As shown in the drawings, a table 12 is mounted upon the upper extremity of a supporting column 10 and a driving motor 14, mounted on the table, is provided with an elongated armature shaft carrying at one end a main grinding wheel 16, and at the opposite end an auxiliary grinding wheel 18. Slidably mounted for movement toward and away from this table and connected in supporting engagement therewith by means of a roller 20 riding in a bracket 22 and a guideway 24 into which is inserted a supporting slide rod 26, is a feed carriage 28 for moving the work toward the grinding wheel to position it for the grinding operation and to advance the work as it is ground away. This carriage 28 is constructed in the form of a two-section housing or casing and serves to support various operating parts and has mounted within it, on bearings 30, a slide bar 32. The slide bar is mounted for reciprocating movement in a path at right angles to the direction of motion of the carriage, and longitudinally of the table, and the extent of reciprocation is controlled by means of a pin 34, carried by the slide bar for movement in a path defined by the slot 36 formed on the side of the carriage. Mounted at opposite ends of the bar 32 are a handle 38 for operating the slide bar 32 and an upwardly extending curved supporting arm 40. This arm carries at its lower extremity, a handle or lever 42 which may be used alternatively or in addition to the handle 38, and at its upper extremity, a hollow, cylindrical bearing member 44 having fitted therein a pivot bar or pin 46. The opposite ends of the pivot bar extend beyond the opposite ends of the bearing element 44 and pivotally carry thereon the arms of a depending yoke-shaped work carrier or holder 50. The body portion 52 of the holder has a guideway 54 extending longitudinally therethrough and is formed at one end with a circular-shaped flat seat 56 against which is adapted to be supported the flange 58 of a rotary cutter 60, the blades of which are to be ground.

The illustrated rotary cutter, which is organized as set forth in my above-mentioned application, is of a type in which a plurality of blades, commonly known as companion blades, are mounted for use in performing a trimming operation upon the side walls of an unfinished heel, and the cutter is characterized by the fact that it is designed to be removed from the heel-trimming machine as a unit and inserted into the abrading machine while in its assembled condition for operation upon each of the blades mounted therein. The head is composed of the flange 58 (Fig. 4) fixedly mounted on a central shaft 62, and a plurality of disks 64, 66 formed with grooves in their opposite interior faces to receive the opposite side edges of cutting blades 68 and to apply clamping pressure to the blades by means of a nut 70 which may be tightened to cause relative approach between the clamping disks 64, 66. In order that each of the blades mounted within the head shall do its share of the heel trimming work properly, it is essential that all the blades be ground so that they project outwardly from the head by an equal amount and to this end the peripheral face of the flange 58 is pierced by a cylindrical bore 57 (Fig. 5) in which is mounted a worm 59 for engagement with a worm gear formed on a collar member 63. This collar member 63 carries a washer fixedly mounted thereon and from this washer there project diametrically positioned stop abutments 65 which engage notches 67 formed in one of the side edges of each of the blades 68. By this arrangement of parts it is apparent that prior to the grinding operation the operative may, by turning the worm 59, advance the abutments 65 circumferentially and thereby advance the blades coincidentally and coextensively, and by mechanism to be presently explained the abrading machine is adapted to operate upon the advanced blades to reduce them to an equal length so that they will remain projecting outwardly from the cutter head equal distances, as required for the proper performance of the heel-triming operation.

In mounting the rotary cutter head in operative position within the grinding machine that portion of the central shaft extending on the side of the flange 58 opposite the blade holding mechanism is inserted into the guideway 54 and a pin 72 carried by the flange 58 is inserted into one of two diametrically opposite cup-shaped depressions 74 (Figs. 1 and 6) formed in the seat portion 56 of the work carrier and the thumb screw 76 is tightened to bear against against the shaft 62 to hold fixedly the cutter head in the supported position. The pin 72 carried by the cutter head is so located with respect to the blades 68 that with the pin in either of the depressions 74 one of the blades will be in proximity to the grinding element and in a position to be operated upon. When the grinding operation is completed on a first blade the other blade may be moved into the exact position occupied by the first blade merely by loosening the thumb screw 76, rotating the head 180° and engaging the pin 72 with the depression opposite the one engaged by the pin during the grinding operation on the first blade. As herein illustrated only two blades are mounted in the cutter head and consequently only two pin and notch engagements are necessary. However, without in any way departing from the scope of the invention the number of interengaging parts between the cutter head and the work holder may be varied to meet the requirements called for by varying the number of knives or blades mounted within the head.

Figure 3:
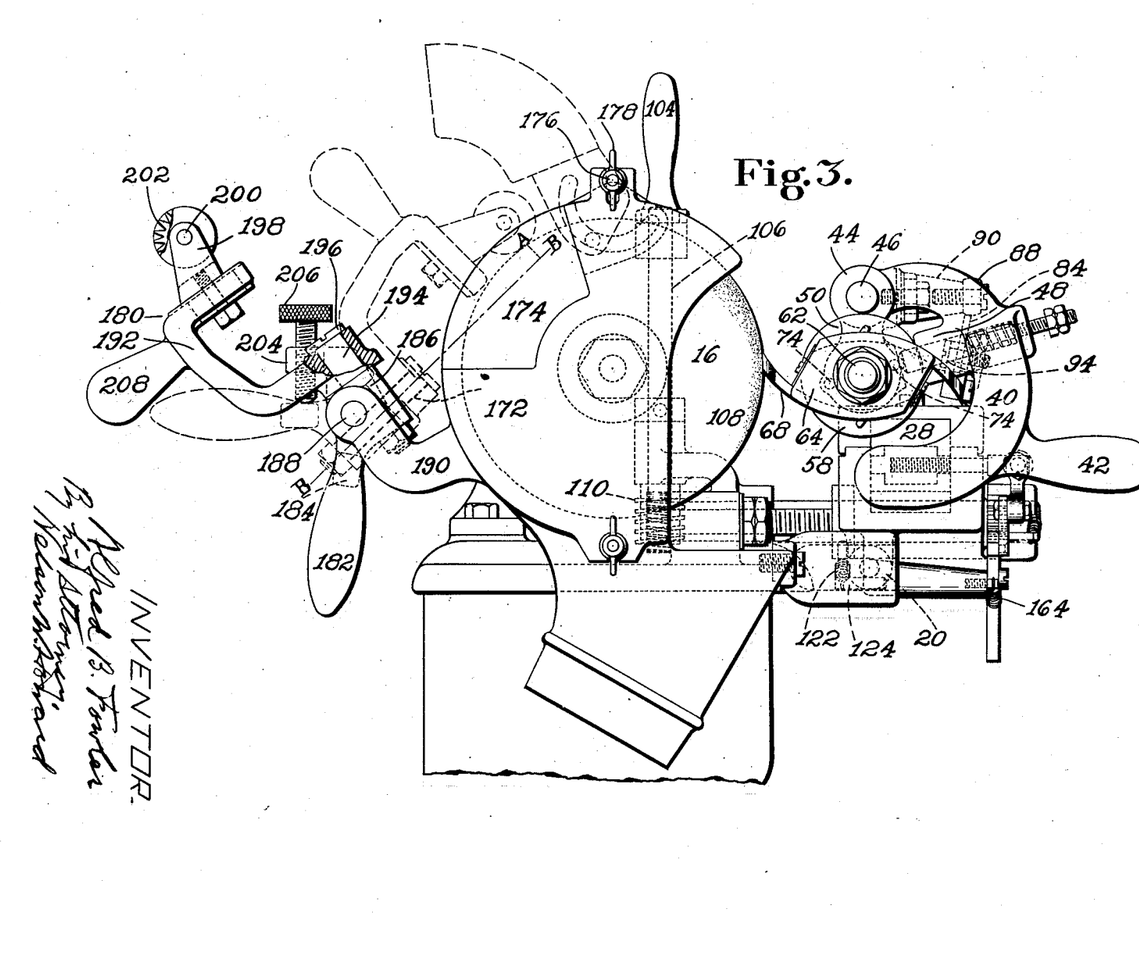
Fig. 3 is a view in side elevation of the mechanism.
Figure 6:
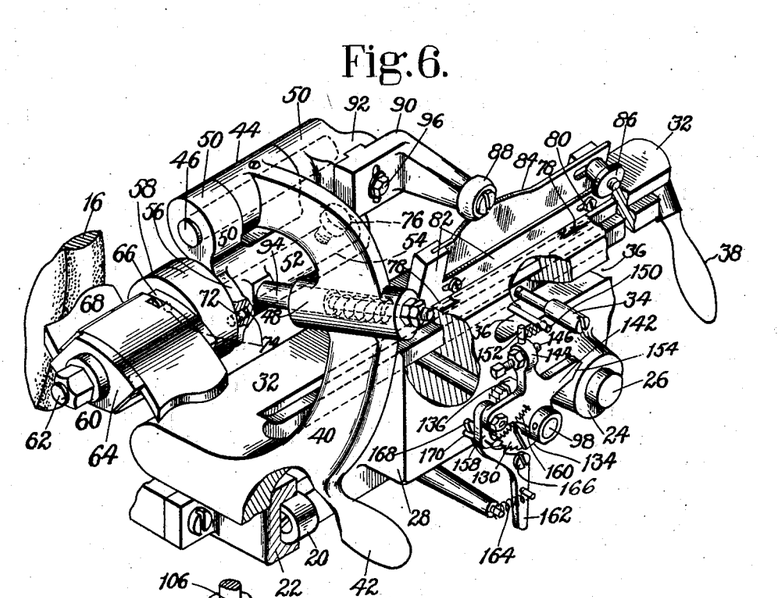
Fig. 6 is a detail view in perspective showing the mounting of the work holder.

From so much of the description as has been given it is clear that since the cutter head is indirectly carried by the slide bar 32, and since the axis of the cutter head in its supported position is parallel to the axis of the slide bar, any longitudinal motion imparted to the slide bar will be directly communicated to the cutter head. Further, since the cutter head carrier is permitted to oscillate on the pivot bar 46, it will be readily understood that if mechanism is provided for controlling the oscillation of the carriage during its longitudinal movement across the face of the grinding element, the abrading operation will impart to the blades a cutting edge having a predetermined edge contour or profile. For the purpose of controlling this oscillatory motion the following arrangement of parts is provided. Upwardly projecting ears 78 extend integrally from the feed carriage 28 and by means of screws and slots 80 adjustably support a templet frame or holder 82. A templet 84 is adapted for insertion into the holder 82 and is held therein, by means of a binding nut 86. The effective outer edge of the templet 84 acts to control the oscillation of the carrier by co-operating with a follower roll 88 mounted on a curved arm 90, which arm is adjustably supported on a projection 92 of the yoke-shaped work holder 52. As shown in Figs. 3 and 6 a cylindrical projection 48 formed on the arm 40 carries a resiliently mounted plunger 94 which is arranged to engage the cutter head carrier 50 and tends normally to swing the work holder toward the left from the position shown in Fig. 3. By virtue of such an arrangement, the roll 88 is held in yielding engagement with the templet 84. As the work carrier 50 is moved relatively to the face of the grinding element by the operative's manipulation of the handle 38, the carrier 50 will be rocked about the pivot bar 46 to swing the work towards or away from the grinding wheel 16, owing to the roll 88 riding across the irregular surface of the templet 84. By forming the templet with a predetermined edge contour it is therefore possible to control the movement of the cutter head carrier toward and away from the grinding element during its movement across the face of the grinding element to impart a desired edge curvature to the blade during the grinding operation. The cutter head 60 is so mounted in the carrier 50 that the axis of curvature of the blade 68 being ground coincides with the axis of oscillation of the carrier 50. Thus, as the blade travels across the grinding wheel 16, and is swung about the pivot 46 by the templet 84, a uniform bevel is given to all portions of the width of the cutting edge of the blade although these portions vary in length because of the contour of the cutting edge.

If it is desired to change the bevel of the cutting edge of the blade, it may be made nearer a right angle by moving the feed carriage 28 (as will later be described) to bring the axis of oscillation 46 nearer to the grinding wheel or it may be made more acute by movement of the carriage away from the wheel. To compensate for such changed position of the axis of oscillation, the work carrier 50 may be adjusted to bring the blade 68 just into contact with the grinding wheel 16 by adjusting the curved arm 90, which carries the follower roll 88, up or down in the guideway on the projection 92 of the carrier 50 and then clamping it in adjusted position by the clamping screw 96.

Figure 7:
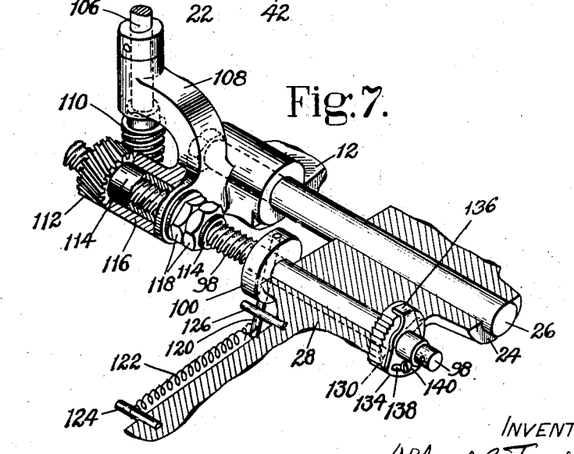
Fig. 7 is a detail view in perspective with certain parts broken away to show more clearly the feeding mechanism.

To provide for feeding the work toward the grinding wheel to facilitate properly positioning the work prior to commencement of the grinding operation and to advance the work toward the grinding element as the cutting edge is ground away during the abrading operation, the mechanism now to be described is provided. A screw threaded shaft 98 extends through the feed carriage 28 and is held against lengthwise movement relative to the carriage by means of collars 100, 102. At the extremity of the shaft opposite the feed carriage, hand-operating mechanism is mounted. This mechanism comprises an operating crank or lever 104 fixedly supported on an upright shaft 106, the shaft 106 being mounted in a bearing member 108, Fig. 7, and carrying at its lower extremity a worm 110. The worm 110 engages a worm gear 112 formed integrally with an interiorly screw threaded sleeve 114, the sleeve being mounted within and supported by a bearing 116 and held against lengthwise movement within the bearing by means of the worm gear 112 and nuts 118. By means of this arrangement rotary movement imparted to the crank member 104 will be communicated to the interiorly screw threaded sleeve 114, causing it to rotate, whereby lengthwise movement of the shaft 98 through the sleeve will be effected. Since the feed carriage is mounted on the shaft 98 and is held against lengthwise movement relatively to the shaft, it is plain that any endwise movement imparted to the shaft by operation of the handle 104 will be directly communicated to the carriage 28 to cause movement of the carrier laterally across the table. In the illustrated embodiment of the invention, the pitch of the threads on the shaft 98 is small to prevent the operative from feeding the blade into the grinding element in such a fast manner as might possibly injure the cutting edge.

Figure 1:
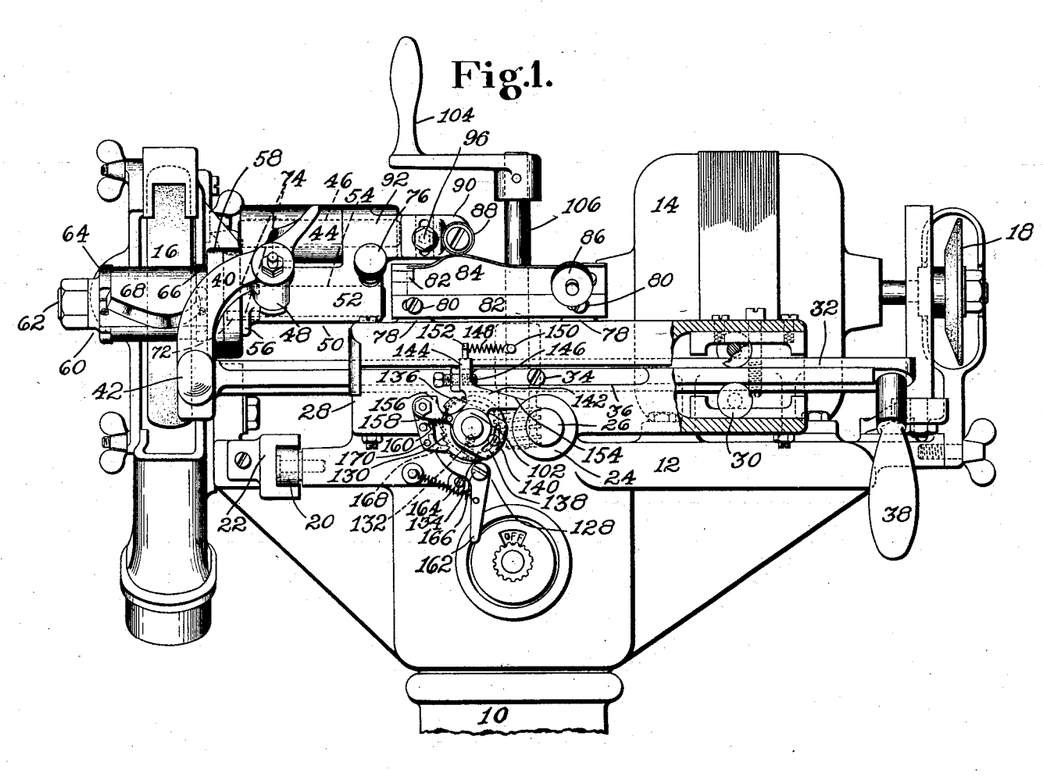
Fig. 1 is a front elevational view of the grinding machine constructed in accordance with the present invention and shows the cutter head, with the companion blades mounted therein, inserted in the machine as a unit.

For automatically effecting feeding movement of the blade toward the grinding element, the collar 100 which is fixedly secured to the shaft is provided on its under side with a pin 120 (Figs. 2 and 7) to which one end of a spring 122 is attached; the other end of the spring being secured to a pin 124 projecting from the carriage of the machine. This spring tends to rotate the shaft in a clockwise direction when viewed from the front end as shown in Fig. 1. The shaft is held from rotation by engagement between the pin 120 and a fixed pin 126 projecting from the rear face of the carriage 28. The shaft 98 projects through and beyond the feed carriage and actuating mechanism 128 is mounted on the projection of the shaft, and is held by the collar 102. This actuating mechanism comprises a notched wheel or ratchet 130 fixedly secured to the shaft 98 by means of a screw 132. A guard or feed controlling device 134 is mounted on the shaft adjacent the wheel 130 and is provided with an angled portion 136 bent rearwardly to provide an effective area for covering a part of the notched edge of the wheel 130. A slot 138 and a screw 140 provide means to adjust the guard for varying the edge part of the wheel covered thereby. Loosely mounted on the shaft 98 between the collar 102 and the guard 134 is a reciprocating lever 142. An upward projection 144 (Figs. 1 and 6) of this lever carries a screw bolt 146 which projects from the lever member into the path of the pin 34 carried by the reciprocating slide bar 32 for movement in the slot 36, all as hereinbefore explained. A spring 148, extending between a pin 150 mounted on the front side of the carrier and a pin 152 mounted on the upward extension 144 of the lever, tends to rotate the lever in a clockwise direction when viewed from the front as shown in Fig. 1. A forward projection 154 of the lever 142 resting normally on the boss of the guideway 24 controls the extent to which the spring 148 is permitted to rotate the lever 142 and is arranged normally to retain the screw bolt in the path of movement of the actuating pin 34. A rearward extension 156 of the reciprocating lever has pivotally mounted thereon a downwardly extending actuating pawl 158 and a spring 160 tends to maintain the pawl in active engagement with the notched wheel or ratchet 130. A locking pawl 162 controlled by a spring 164 is pivotally mounted at 166 also to engage the notches of the wheel 130. An extension 168 is provided at the engaging end of the pawl 162 for contacting with a pin 170 carried by the pawl 158 whereby the operative, in releasing the pawl 162 from engagement with the ratchet 130, automatically releases the depending pawl 158.

From the preceding discussion, it will be seen that in operation the pin 34 in traversing to the left, as viewed in Fig. 1, strikes the projecting screw bolt 146, thereby actuating the lever 142 and causing the pawl 158 to act to rotate the wheel 130 and shaft 98. This counter clockwise rotation of the shaft causes the threaded portion of the shaft to be drawn rearwardly into the sleeve or collar member 114 and moves rearwardly the feed carriage. By varying the setting of the screw 146 the stroke of the lever 142 will vary to cause the pawl 158 to rotate the shaft through arcs of various lengths, and subsequently will act to vary and control the amount of feed imparted to the carrier during each traversing of the slide bar 32. The guard 134 is positioned to control the total extent of rearward movement of the carrier and when the reciprocation of the slide bar 32 causes the effective area 136 of the guard to rotate with the wheel into a position under the point of the pawl 158, further operation of the pawl on the wheel is prevented. At this point, the operative, by manually disengaging the pawl 162, disengages also the pawl 158 and leaves the spring 122 free to rotate the shaft in a clockwise direction to the position it occupied prior to the automatic feeding operation. The operative may then, by loosening the thumb screw 76, rotate the cutter head through an angle of 180° to bring the other knife or blade into the position formerly occupied by the first blade and, upon the operative again manipulating the handle 38 the second blade will be fed toward the grinding element the exact distance the first blade was fed to effect grinding operations on the second blade that will be identical with the operations performed on the first.

Figures 2, 4, 5:
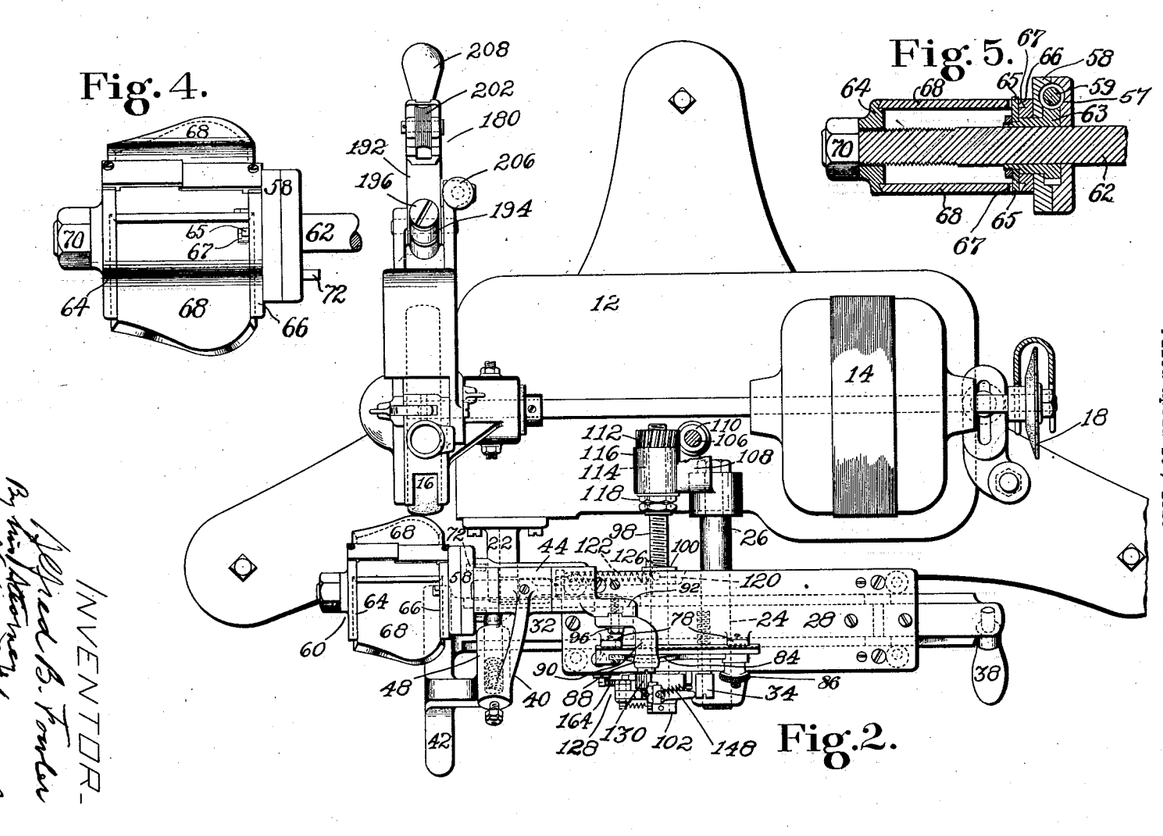
Fig. 2 is a top plan view of the mechanism shown in Fig. 1.
Fig. 4 is a detail view showing the construction and arrangement of parts of the cutter head in assembled form.
Fig. 5 is a sectional view of the mechanism shown in Fig. 4.

To provide means to redress or true the grinding element, a guard cover 172 is provided whose upper portion 174 is adapted to be pivoted about the bolt 176, and to be held in an uncovered position by means of the butterfly or wing nut 178 to permit a dressing tool 180 to be presented to the back face of the grinding wheel. As shown in Figs. 2 and 3 my improved type of dressing tool comprises a handle member 182 carrying an abutment 184 and a bearing 186; the handle being pivoted at 188 on an arm 190. A yoke 192 is pivotally mounted at 194 by means of the screw 196 and carries at its upper end a U-shaped bracket member 198. As illustrated in Figs. 2 and 3 of the drawings, a pin 200 extends between the arms of the bracket 198 and has mounted thereon a plurality of small circular disks 202 carrying indentations of suitable shape in their peripheries. A fixed projection 204 of the arm 190 carries an adjusting screw 206. This adjusting screw controls the position of the dressing tool with respect to the grinding element to allow the tool to be moved forward into operative engagement as the wheel is worn away.

In operation, the dressing tool is swung about the pin 188 to bring the abutment 184 in contact with the screw 206 as shown in dotted lines in Fig. 3 of the drawings. The operative then grasps the handle 208 and oscillates the disk members 202 about the pivot 194 and over the face of the rotating grinder. In redressing or trueing a grinder to a curved edge countour, it is usually desired that the periphery of the grinder be symmetrical with respect to its central plane (i. e., a plane disposed at right angles to the central axis of the grinder and equi-distant from the opposite faces thereof). To this end the pivot 194 about which the tool oscillates is located within the central plane of the grinder, and the arc through which the tool oscillates has a radius of curvature equal to the radius of the curvature that it is desired to impart to the periphery of the grinder. This radius of curvature is determined by, and is equivalent to, the perpendicular distance between A, the point of contact of the disks 202 with the grinding element, and a line B—B drawn through the axis of the pivot 194 (as shown in dotted lines Fig. 3).

Although the invention is illustrated and described as applying to an abrading machine for grinding an assembled rotary cutter having a plurality of curved blades, the invention is not so limited, as it may be applied to any apparatus or machine for abrading or grinding other forms of cutters or unassembled blades, the invention being limited only by the scope of the following claims.

Having thus described my invention, what I claim as new and desire to secure by Letters Patent of the United States is:

1. In an abrading machine for operating upon curved cutter blades, an abrading element, a work holder mounted to oscillate about an axis, the radius of oscillation being substantially equal to and coincident with the radius of curvature of the blade, means for guiding the blade in reciprocating movement with respect to the abrading element, and means dependent upon said reciprocating movement to oscillate the holder toward and away from the abrading element during the reciprocating movement.

2. In a grinding machine, an abrading element, a slide bar, a work holder supported by the slide bar for traversing movement therewith, means to feed the holder bodily toward the abrading element at the end of the traversing movement of the slide bar, means actuated by the traversing movement for rocking the holder toward and away from the abrading elements to impart a predetermined shape to the work, and yielding means tending to rock the holder towards the abrading element.

3. In a grinding machine, a grinding element, a slide bar mounted for reciprocation a work holder mounted on the reciprocable slide bar for rocking movement toward and away from the grinding element and for traversing movement along the grinding element, means to feed the holder bodily toward and away from the grinding element, and means dependent upon reciprocation of said slide bar for controlling the rocking movement of the carriage to impart a predetermined shape to the work, said latter named means comprising a templet mechanism.

4. In a machine for grinding the blades of an assembled rotary cutter head, a table, a rotary, abrading element mounted upon said table, a carriage mounted upon said table for movement in a direction at right angles to the axis of the brading element, bearings mounted within said carriage, a slide bar extending through said bearings, a yoke mounted at one extremity of said slide bar, a work holder mounted at one end of said yoke, and a follower roll mounted at the opposite end of said yoke for engagement with a templet carried by said carriage.

5. An abrading machine for operating upon the blades of an assembled rotary cutter head comprising an abrading element, a slide bar mounted for reciprocation relatively to said abrading element, an arm formed at one extremity of said slide bar, a bearing carried by said arm, a yoke pivotally connected to said bearing, a work holder secured to one end of said yoke, and a follower roll secured to the opposite end of said yoke for engagement with a templet mechanism.

6. In a machine for operating upon the blades of an assembled rotary cutter head, an abrading element, a reciprocable slide bar, a yoke carried by said slide bar, a work holder pivotally secured to said yoke for traversing movement with said slide bar relatively to the abrading element, and means carried by said yoke for engagement with a templet device to impart swinging movement to said work holder depending upon said reciprocation of said slide bar, said templet engaging means being located upon one side of the axis of pivot of the work holder, and said abrading element being located upon the opposite side thereof.

7. In an abrading machine, an abrading element, a work holder constructed and arranged to present an end of a longitudinally arcuate cutter blade to the abrading element to form on the concave surface of the blade a cutting edge, and a pivot about which the holder may swing to bring the end of the blade into contact with the abrading element, said pivot being coaxial with the axis of curvature of the blade, whereby said swinging movement will give to said edge a constant bevel irrespective of the length of the blade at the point being abraded.

8. In an abrading machine, an abrading element, a work holder constructed and arranged to present an arcuate cutter blade to the abrading element, said element and holder being relatively movable, means for guiding one of said parts to effect relative movement in the general direction of the axis of curvature of the blade to form a cutting edge, additional guiding means for effecting a relative movement of approach and recession between the blade and abrading element to give a predetermined profile to the cutting edge, and a pivot, coaxial with the axis of curvature of the blade, about which the latter movement takes place, whereby said latter movement gives to the blade a uniform bevel throughout the profile of the cutting edge.

9. In an abrading machine, an abrading element, a work holder constructed and arranged to present an arcuate cutter blade to the abrading element, said element and holder being relatively movable, means for guiding one of said parts to effect relative movement in the general direction of the axis of curvature of the blade to form a cutting edge, additional guiding means for effecting a relative movement of approach and recession between the blade and abrading element to give a predetermined profile to the cutting edge, a pivot, coaxial with the axis of curvature of the blade, about which the latter movement takes place, whereby said latter movement gives to the blade a uniform bevel throughout the profile of the cutting edge, and means for adjustably positioning the pivot relatively to the abrading element to give to the edge an adjustably predetermined bevel.

10. In an abrading machine, an abrading element, a work holder adapted to receive as a unit an assembled rotary cutter having arcuate cutter blades, said holder and element being relatively movable, means for guiding one of said parts to effect relative movement in the general direction of the axis of curvature of the blade, to carry each blade in turn across a face of the abrading element to form a cutting edge, a pivot about which the holder may swing toward and from the abrading element, means to move the holder about the pivot, said pivot being substantially coaxial with the axis of curvature of the arcuate blade being operated upon, to give a uniform bevel to its cutting edge, and means for adjustably positioning the pivot relatively to the abrading element to give to each edge an adjustably predetermined bevel.

In testimony whereof I have signed my name to this specification.

ALFRED B. FOWLER.